(12) United States Patent
Fry et al.

(10) Patent No.: US 7,607,302 B2
(45) Date of Patent: Oct. 27, 2009

(54) AUTOMOTIVE TURBOCHARGER SYSTEMS

(75) Inventors: Malcolm Fry, West Sussex (GB); Richard C. E. Cornwell, West Sussex (GB); Richard King, Hove (GB); Matthew Gerard Beasley, West Sussex (GB)

(73) Assignee: Ricardo UK Limited, West Sussex (GB)

( * ) Notice: Subject to any disclaimer, the term of this patent is extended or adjusted under 35 U.S.C. 154(b) by 0 days.

(21) Appl. No.: 10/570,877

(22) PCT Filed: Sep. 6, 2004

(86) PCT No.: PCT/GB2004/003809

§ 371 (c)(1),
(2), (4) Date: Oct. 25, 2006

(87) PCT Pub. No.: WO2005/024201

PCT Pub. Date: Mar. 17, 2005

(65) Prior Publication Data

US 2007/0062188 A1    Mar. 22, 2007

(30) Foreign Application Priority Data

Sep. 8, 2003    (GB) ................... 0320986.3

(51) Int. Cl.
*F02B 33/44*    (2006.01)
*F02D 23/00*    (2006.01)
*F02B 37/013*    (2006.01)

(52) U.S. Cl. .......................... 60/612; 60/602

(58) Field of Classification Search ............ 60/612, 60/602; 123/562; 251/214, 305, 308; *F02B 37/013*; *F02D 23/00*
See application file for complete search history.

(56) References Cited

U.S. PATENT DOCUMENTS 4,930,315 A    6/1990    Kanesaka ............ 60/612
5,142,866 A    9/1992    Yanagihara et al. ...... 60/612

(Continued)

FOREIGN PATENT DOCUMENTS

DE    195 14 572    10/1996
DE    10144663 AL    * 4/2003

(Continued)

OTHER PUBLICATIONS

A Translation German Patent No. DE 195 14 572 A1.*

(Continued)

*Primary Examiner*—Thai Ba Trieu
(74) *Attorney, Agent, or Firm*—Dickstein Shapiro LLP

(57) ABSTRACT

A turbocharger system comprising first and second turbochargers, configured in series, where the turbochargers hand over control from one turbocharger to the other, which incorporates switching adjustment terms at the point of transition to ensure a smooth transition.

7 Claims, 5 Drawing Sheets

U.S. PATENT DOCUMENTS

| | | | |
|---|---|---|---|
| 5,408,979 A | 4/1995 | Backlund et al. | 60/612 |
| 5,630,571 A | 5/1997 | Kipp et al. | 251/214 |
| 6,273,119 B1 * | 8/2001 | Foster et al. | 251/305 |
| 6,338,467 B1 * | 1/2002 | Mabboux et al. | 251/305 |
| 6,698,717 B1 * | 3/2004 | Brookshire et al. | 251/305 |
| 6,904,353 B1 * | 6/2005 | Kolavennu et al. | 60/602 |
| 2006/0123782 A1 * | 6/2006 | Rosin et al. | 60/612 |
| 2007/0151243 A1 * | 7/2007 | Stewart | 60/612 |
| 2007/0295007 A1 * | 12/2007 | McNulty et al. | 60/612 |

FOREIGN PATENT DOCUMENTS

| | | | |
|---|---|---|---|
| JP | 61 210223 A | * | 9/1986 |
| JP | 63 009616 A | * | 1/1988 |
| JP | 03 290028 A | * | 12/1991 |
| JP | 2003 254051 A | * | 9/2003 |

OTHER PUBLICATIONS

Pflueger F: "Die Zweistufige Geregelte Aufladung von KKK: Ein Neues Aufladesystem Fuer Nfz-Motoren" Atz Automobiltechnische Zeitschrift, Franckh'Sche Verlagshandlung, Stuttgart, DE, vol. 100, No. Suppl. 7/8, Jul. 1, 1998, pp. 68-70 and 72.

* cited by examiner

AUTOMOTIVE TURBOCHARGER SYSTEMS

This application claims priority to Great Britain application serial number 0320986.3, filed Sep. 8, 2003, and international application number PCT/GB2004/003809, filed Sep. 6, 2004, the entirety of each is hereby incorporated by reference herein.

FIELD OF THE INVENTION

The present invention relates to turbocharger systems for automotive engines.

BACKGROUND

Turbochargers are of course well known devices which include a compressor or blower wheel, typically an impeller, which is situated in an engine inlet duct and is connected to an exhaust turbine, which is situated in the engine exhaust duct and arranged to be rotated at high speed by the engine exhaust gases. Rotation of the exhaust turbine results in rotation of the blower wheel which produces a boost pressure, that is to say it increases the pressure in the inlet duct to a superatmospheric value. The result of this increased inlet pressure is that a greater amount of air is admitted into each cylinder of the engine during the induction stroke of the pistons in the cylinders, which results in an increased power output from the engine.

The power absorbed from the exhaust gases by a turbocharger exhaust turbine is proportional to the cube of the speed of the exhaust gases, which means that although the blower wheel rotates very rapidly and thus produces a substantial boost pressure at high engine speed, it does not rotate at all or only at negligible speed at low engine speed. This means that no boost pressure is available at a time when maximum engine power is frequently needed, i.e. when accelerating rapidly from engine idle speed.

One way of overcoming this problem is to increase the speed of the exhaust gases past the exhaust turbine. This can be done by providing guide vanes of variable pitch in the exhaust duct to enable the local exhaust gas speed to be increased and thus the power output of the turbine wheel to be increased, even at low engine speed. However, such a construction is complex and expensive and subject to failure as a result of lubrication problems. Simply making the turbocharger physically smaller, thereby increasing the exhaust velocity through it, would substantially improve the characteristics of the turbocharger at low engine speeds, but at high engine speeds the exhaust turbine would constitute an unacceptable flow restriction for the exhaust gases and would be liable to failure as a result of being driven at an unacceptably high speed.

It has been proposed that an automotive engine be provided with a turbocharger system comprising two turbochargers, one relatively small and the other relatively large. The two blower wheels are provided in series in the engine inlet duct and the two exhaust turbines are provided in series in the exhaust duct. Since the small turbocharger is inappropriate at high engine speeds and would be liable to failure if used at such speeds, the smaller exhaust turbine and the smaller blower wheel are provided with respective bypass passages incorporating respective shut-off valves operated under the control of the engine management system.

The operation of such a system is supposed to be as follows: The two bypass valves are shut at low engine speeds. The relatively small volume of exhaust gas flows through the exhaust turbine of the smaller turbocharger at a substantial speed due to the relatively small dimension of the duct in which the turbine is situated. The smaller exhaust turbine is thus rotated at a substantial speed and this rotation is transmitted to the smaller blower wheel, which thus creates a significant boost pressure in the inlet duct. The exhaust gas also flows through the exhaust turbine of the larger turbocharger, but at a significantly lower speed due to its greater size. The larger exhaust turbine is thus rotated very slowly, if at all, and the larger blower wheel thus plays effectively no part in the creation of the boost pressure. As the engine speed and/or load rises, the engine management system opens the two bypass valves. The exhaust gas now flows through the passage bypassing the smaller exhaust turbine and then flows through the larger exhaust turbine where it now reaches a substantial speed due to the increased flow rate of exhaust gas. The larger exhaust turbine is thus rotated at high speed and this rotation is transmitted to the larger blower wheel, which creates a boost pressure in the inlet duct. The bypass duct around the smaller blower wheel has larger flow area than that of the smaller blower and thus does not constitute an unacceptable flow restriction in the inlet duct.

Accordingly, such a composite turbocharger system should provide a solution to the problem of inadequate boost pressure at low engine speeds. However, it is found in practice that it does not do so and tests have indicated that an engine fitted with such a turbocharger system has a power output of only about two-thirds of that which would be expected at low engine speeds.

In addition difficulties are encountered in controlling operation of the individual turbochargers and in particular airflow. For example the larger turbocharger has a turbine bypass valve (for bypassing the larger turbine in an overboost or overspeed condition) and control of the smaller turbine bypass and larger turbine bypass must be achieved without competition between the control strategies. Yet a further problem is that the smaller compressor can act as a restriction on airflow from the larger compressor whilst producing no pressure rise at higher engine speeds/loads.

It is, therefore, the object of the invention to provide a turbocharger system of the type incorporating two turbochargers which does provide a substantial boost pressure at substantially all engine speeds and enables the engine to produce a significantly enhanced power output at low engine speeds.

SUMMARY

According to the present invention, a turbocharger system for an automotive engine comprises an air inlet duct, an exhaust gas duct and first and second turbochargers, the first turbocharger being substantially smaller than the second turbocharger, each turbocharger including an exhaust turbine situated in the exhaust duct and a blower wheel situated in the inlet duct, a bypass duct being connected to the exhaust duct on each side of the exhaust turbine of the first turbocharger, the bypass duct including a selectively operable butterfly shut-off valve including a valve flap pivotally mounted within a housing, the internal wall of the housing carrying two oppositely directed semi-annular sealing surfaces extending transversely to the direction of the exhaust gas flow, the valve flap being movable between an open position in which the bypass duct is substantially unrestricted and a closed position in which it is in sealing engagement with the two sealing surfaces.

Exhaustive tests on the known turbocharger system including two turbochargers have revealed that the reason why it does not produce a satisfactory boost pressure at low engine speeds is that the bypass valve is inherently leaky and a substantial proportion of the exhaust gas thus flows through the bypass passage and not through the smaller exhaust turbine, even when the bypass valve is nominally closed. Although numerous different types of shut-off valve are known, the high pressures and temperatures and aggressive conditions which prevail in an automotive exhaust duct mean that one type of valve that is practicable is a butterfly valve. However, in order to avoid the valve flap becoming jammed against the wall of the housing, particularly as a result of the differential thermal expansion which occurs, it is, as a matter of practice, necessary to make the valve flap significantly smaller than the housing in which it is pivotally accommodated. This means that there is in practice a significant gap between the internal wall of the housing and the outer edge of the valve flap, when the valve is closed. This gap constitutes the leakage path through which a significant proportion of the exhaust gas escapes and thus does no work in the exhaust turbine.

It has thus been appreciated that what is needed is to substantially improve the gas tightness of the bypass valve, when closed, and this is achieved by the two semi-annular sealing surfaces in the present invention. These two sealing surfaces will in practice be offset in the housing in the direction of exhaust gas flow through it by a distance substantially equal to the thickness of the valve flap. Thus when the valve is closed, a seal is created not between the outer edge surface of the valve flap and the inner surface of the valve housing, as previously, but between the outer portion of one flat surface of one half of the valve flap and one of the sealing surfaces and between the outer portion of the other flat surface of the other half of the valve flap and the other of the sealing surfaces.

In one embodiment, two semi-annular sealing projections are provided on the internal surface of the housing, opposite side surfaces of which constitute respective sealing surfaces. Alternatively, the interior surface of the bypass valve housing may be effectively smoothly continuous throughout with the exception of two discontinuities at which the respective sealing surfaces are defined. In this latter embodiment, the two portions of the gas flow passage through the housing on opposite sides of the valve flap are effectively slightly offset from one another in a direction transverse to the direction of gas flow through it, whereby the two opposed sealing surfaces are afforded at the discontinuities, that is to say at the positions where the offset portions of the flow passage merge into one another. The flow passage through the housing may of course be of any shape conventional with butterfly valves, e.g. circular or rectangular.

The provision of the opposed sealing surfaces with which the valve flap co-operates in the closed position results in the valve forming a very effective seal. Little or no exhaust gas thus leaks through the bypass passage when the valve is closed which results in substantially all of the exhaust gas flow flowing past the turbine wheel of the smaller turbocharger at low engine speeds, whereby the blower wheel of the smaller turbocharger may produce a substantial boost pressure in the air inlet duct. The power output of the engine is therefore substantially increased at low engine speeds by comparison with engines with dual turbocharger systems of known type.

The present invention also embraces an automotive engine including a turbocharger system of the type referred to above. Further aspects of the invention are set out in the claims.

Further features and details of the invention will be apparent from the following description of one specific embodiment which is given by way of example with reference to the accompanying drawings, in which:

DETAILED DESCRIPTION

Figure 1:
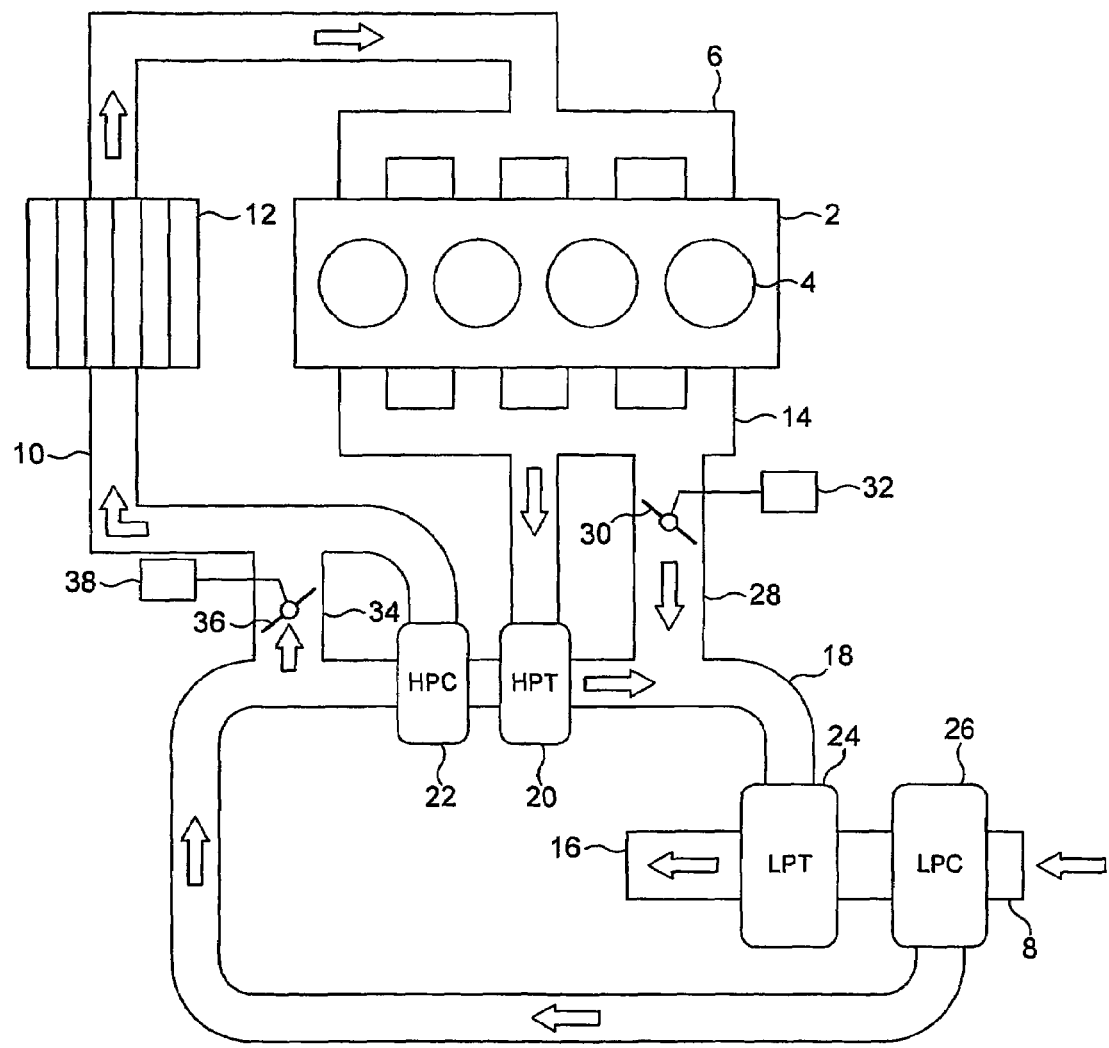
FIG. 1 is a highly diagrammatic view of an automotive engine including a turbocharger system in accordance with the invention.

FIG. 1 diagrammatically illustrates an automotive engine 2, which in this case has four cylinders 4. The cylinders 4 communicate via one or more respective inlet valves with an inlet manifold 6 which communicates with the atmosphere at an air inlet 8 via an inlet duct 10, which includes an intercooler 12. The cylinders 4 of the engine also communicate via one or more respective exhaust valves with an exhaust gas manifold 14 which communicates with the atmosphere at an outlet 16 via an exhaust gas duct 18.

The engine includes a turbocharger system comprising two turbochargers, each of which includes an exhaust gas turbine situated in the exhaust duct 18 and an air blower wheel or compressor which is connected thereto and is situated in the air inlet duct 10. One of these turbochargers is substantially larger than the other, which is to say that its exhaust gas turbine and its air blower wheel and the passages in which these are situated are substantially larger than those of the smaller turbocharger. More specifically, the smaller turbocharger includes an exhaust gas turbine 20 in the exhaust duct 18 connected to an air blower wheel 22 in the inlet duct 10. The larger turbocharger has an exhaust turbine wheel 24 in the exhaust duct 18 connected to an associated blower wheel 26 in the inlet duct 10. Connected to the exhaust gas pathway upstream and downstream of the smaller exhaust gas turbine 20 is a bypass passage 28. Situated in this bypass passage is a butterfly shut-off valve 30 connected to be rotated between an open and a closed position by an actuator 32 which is actuated in response to signals produced by a control system, typically the engine management system with which most modern automotive engines are now provided. As discussed above, it is crucial that the butterfly valve 30 forms a reliable seal, when in the closed position, and its detailed construction will be discussed below. The smaller turbocharger can be termed a high pressure turbocharger and the larger one a low pressure turbocharger, with the individual components named accordingly.

Connected to the inlet duct 10 upstream and downstream of the blower wheel 22 of the smaller turbocharger is a further bypass passage 34. Situated in this passage is a further butterfly shut-off valve 36, which is again connected to an actuator 38 under the control of the engine management system. The pressure differentials and temperature variations in the inlet duct are very much smaller than those in the exhaust duct and the ability of the butterfly valve 36 to form a reliable seal, when in the closed position, is very much less important than in connection with the exhaust shut-off valve 30. Accordingly, the bypass valve 36 may be of the same construction as the bypass valve 30, to be described below, or it may be of conventional construction.

Figure 2:
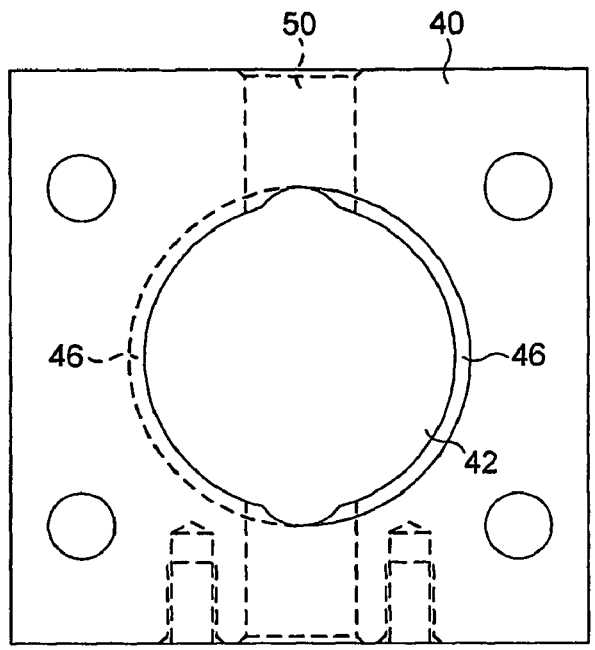
FIG. 2 is a view from one end of the exhaust gas bypass valve housing, from which the valve flap has been omitted for the sake of clarity.
Figure 3:
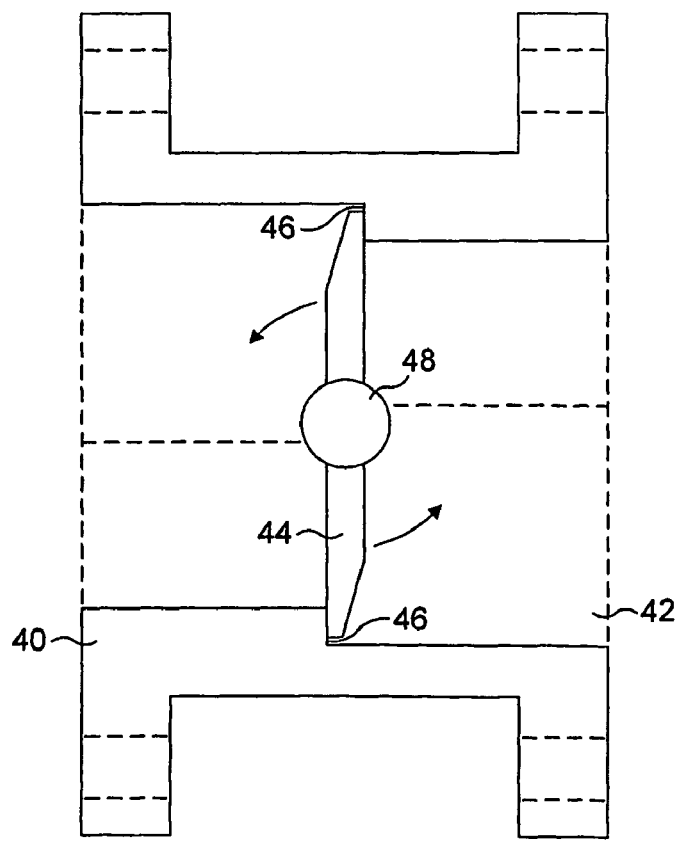
FIG. 3 is a sectional side view of the exhaust gas bypass valve.

As shown in FIG. 2, the exhaust butterfly valve 30 comprises a housing 40, through which a flow passage 42 extends and which is connected at its two ends to the exhaust duct 18. Pivotally mounted within the circular flow passage 42 is a valve flap 44. As may be seen in FIG. 3, the diameter of the valve flap 44 is significantly less than that of the portion of the flow passage 42 in which it is accommodated, thereby ensuring that differential expansion does not result in the valve flap 44 becoming jammed within the passage. The wall surface defining the flow passage 42 is smooth and circular but has two semi-annular discontinuities formed in it at positions which are spaced apart in the direction of the length of the flow passage by a distance equal to the width of the valve flap 44. These discontinuities constitute two oppositely directed, semi-annular sealing surfaces 46, one of which is visible when looking through the flow passage from one end and the other of which is visible when looking through the flow passage from the other end. The valve flap 44 is mounted on two stub shafts 48 accommodated in respective openings 50 in the valve housing 40. One of these stub shafts 48 is connected to the actuator 32. This actuator is arranged to rotate the valve flap 44 under the control of the engine management system between an open position, in which the valve flap extends substantially parallel to the axis of the flow passage 42 and the flow passage 42 is therefore substantially unobstructed, and a closed position, which is illustrated in FIG. 3, in which the valve flap 44 closes the flow passage 42. As may be seen in FIG. 3, when the valve flap is in the closed position, it engages the two sealing surfaces 46 with its opposed side surfaces. The valve flap thus forms a reliable seal with the wall surface of the flow passage and thus reliably closes the flow passage.

In use, at low engine speeds, the high pressure turbine bypass valve 30 and high pressure compressor bypass 36 are both closed. The turbine bypass valve 30 forms a reliable seal and all the exhaust gas is thus directed through the smaller exhaust gas turbine 20. Due to the relatively small size of this turbine, the gas flowing through it reaches a relatively high speed and rotates the exhaust turbine and thus also the air blower 22 attached to it at a relatively high speed. The blower wheel 22 thus produces a substantial boost pressure in the inlet duct 10. The exhaust gases also flow through the exhaust gas turbine 24 of the larger turbocharger but, due to its substantially larger area, the larger exhaust gas turbine is rotated only at low speed. It does, however, constitute only a negligible flow resistance. It is necessary (and a practical limitation often overlooked in two stage and sequential turbocharging schemes) to maintain low speed rotation of the "idle" turbocharger in order to keep the bearings and oil seals of the turbocharger in order. When the engine speed reaches a higher value predetermined by the engine management system, the two bypass valves 30 and 36 are opened. Due to the fact that the area of the bypass passage 28 is substantially greater than that of the duct leading to the smaller exhaust gas turbine, substantially all the exhaust gas bypasses the smaller turbine 20 and flows through the bypass passage 28. It then flows through the larger exhaust gas turbine 24 and rotates it and thus also the larger air blower wheel 26. The air blower wheel 26 thus produces a boost pressure in the inlet duct 10. Since the flow passage through the smaller air blower 22 is relatively small, this would constitute a significant flow restriction and it is for this reason that the further bypass passage 34 is provided. As mentioned above, the high pressure compressor bypass valve 36 is opened at higher engine speeds and due to the fact that the flow area of the bypass passage 34 is significantly greater than that of the larger air blower wheel 22, substantially all the inlet air bypasses the smaller blower wheel 22 at higher engine speeds and flows through the bypass passage 34.

A turbocharger system in accordance with the invention can thus produce a substantial boost pressure in the inlet duct not only of high engine speeds but also at low engine speeds and therefore overcomes the traditional problem that turbochargers are largely ineffective at low engine speeds.

Figure 4:
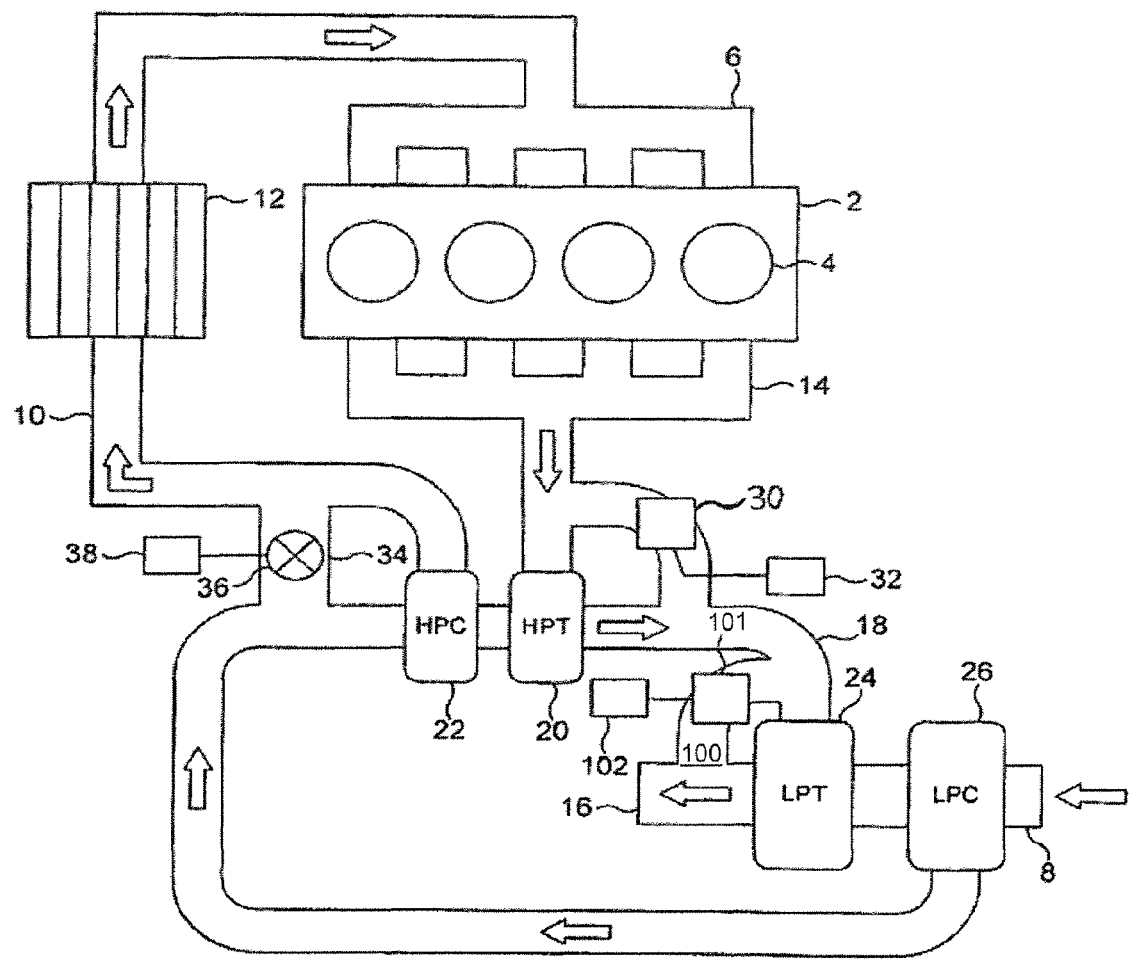
FIG. 4 is a schematic diagram showing in more detail the components of an engine with a two-stage turbocharger.

Referring to FIG. 4 an engine system of the type described in FIG. 1 is shown but with additional components now described. Common reference numerals denote common components and will not be described further for the avoidance of repetition.

In particular it will be seen that an additional bypass 100 is Provided around the low pressure turbine 24 controlled by a controller 102. As the aim of the system as a whole is to achieve a desired boost it will be seen that control of the high pressure and low pressure turbine bypass or valves 30, 101, by respective controllers 32, 102 must be achieved without competition between the control strategies which could give rise to unstable or inefficient operation.

It will be appreciated that the various components described herein including the turbocharger components and control components can be of any appropriate form as will be apparent to the skilled reader. For example, control can be affected by appropriate software implemented on an engine control unit (ECU).

As engine speed/load is increased from idle, all three valves are shut and the system uses both turbines and compressors in series. Because the high pressure turbocharger is substantially smaller than the low pressure turbocharger, it is this machine which will provide the majority of the boost pressure at low engine speeds when the exhaust gas flow rate is low. At medium/low speeds the high pressure turbocharger 20 starts to over-boost or over-speed and exhaust gas must be bypassed around the high pressure turbine 20 to control the output of the high pressure turbocharger, allowing exhaust gas to feed the low pressure turbine 24 directly. At higher engine speeds the exhaust gas massflow is substantially greater than the flow capacity of the high pressure turbine and therefore the bypass valve 30 opens fully to completely bypass the high pressure turbine (subject to previous comments regarding maintaining seals and bearings in satisfactory order). On the inlet side, the high pressure compressor bypass valve 36 is opened when the (slowly rotating) high pressure compressor 26 acts as a restriction, owing to the high pressure turbine being substantially bypassed. At still higher engine speeds the low pressure turbocharger 24 starts to over-boost or over-speed and it must be bypassed.

Figure 5:
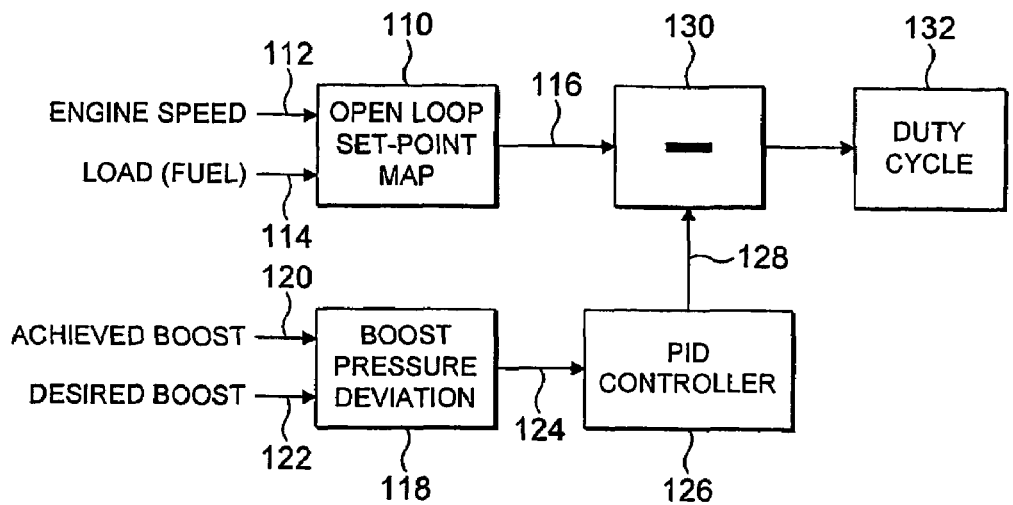
FIG. 5 is a schematic block diagram showing a closed loop control scheme for a bypass valve.

In particular closed loop control of the high pressure turbine bypass valve 30 and the low pressure turbine bypass valve 101 is required with hand over of control from one to the other effected so as to provide a smooth transition. A basic control scheme is shown in FIG. 5 in which each valve 30, 101 is controlled on the basis of a feedback loop, enclosed loop operation, based on an open loop set point map 110. The open loop set point map 110 comprises a mapping of engine speed and load (e.g. fuel) at input 112 and 114, which are measured by any appropriate sensor (not shown). These variables are mapped to an output set point 116 comprising valve position. The target variable is a desired boost pressure at the engine and so boost pressure deviation 118 is obtained from inputs of achieved boost (for example measured at the intake manifold 6 by a sensor (not shown)) as against desired boost for example as derived from the set point or from the engine control unit from the engine speed and load inputs 112, 114. The achieved boost and desired boost are input at 120, 122 respectively to the boost pressure deviation block 118. The deviation is output at 124 to a proportional integral derivative (PID) controller 126 of the type that will be well known to the skilled person. The PID controller 126 output comprises a correction 128, which is input to a differencer at 130 together with the valve set point output 116 and these are output to the duty cycle 132 controlling operation of the valve and in particular the valve position. As a result closed loop control is provided in which the valve position converges on the position providing the desired boost.

The required position of each valve is very non-linear, for example the high pressure turbine bypass valve 30 must open slowly to control the high pressure turbo 20, but then open quickly as the turbine needs to be completely bypassed. To a certain extent the high pressure turbine bypass valve must fulfill two functions, that of bypassing (wastegating) the high pressure turbine to modulate boost at low engine speeds, and that of completely bypassing the turbine at higher engine speeds. It is therefore important that the closed loop controller uses the calibrated open loop maps as a basis for closed loop control (to control to a desired boost pressure for a given speed and load).

Figure 6:
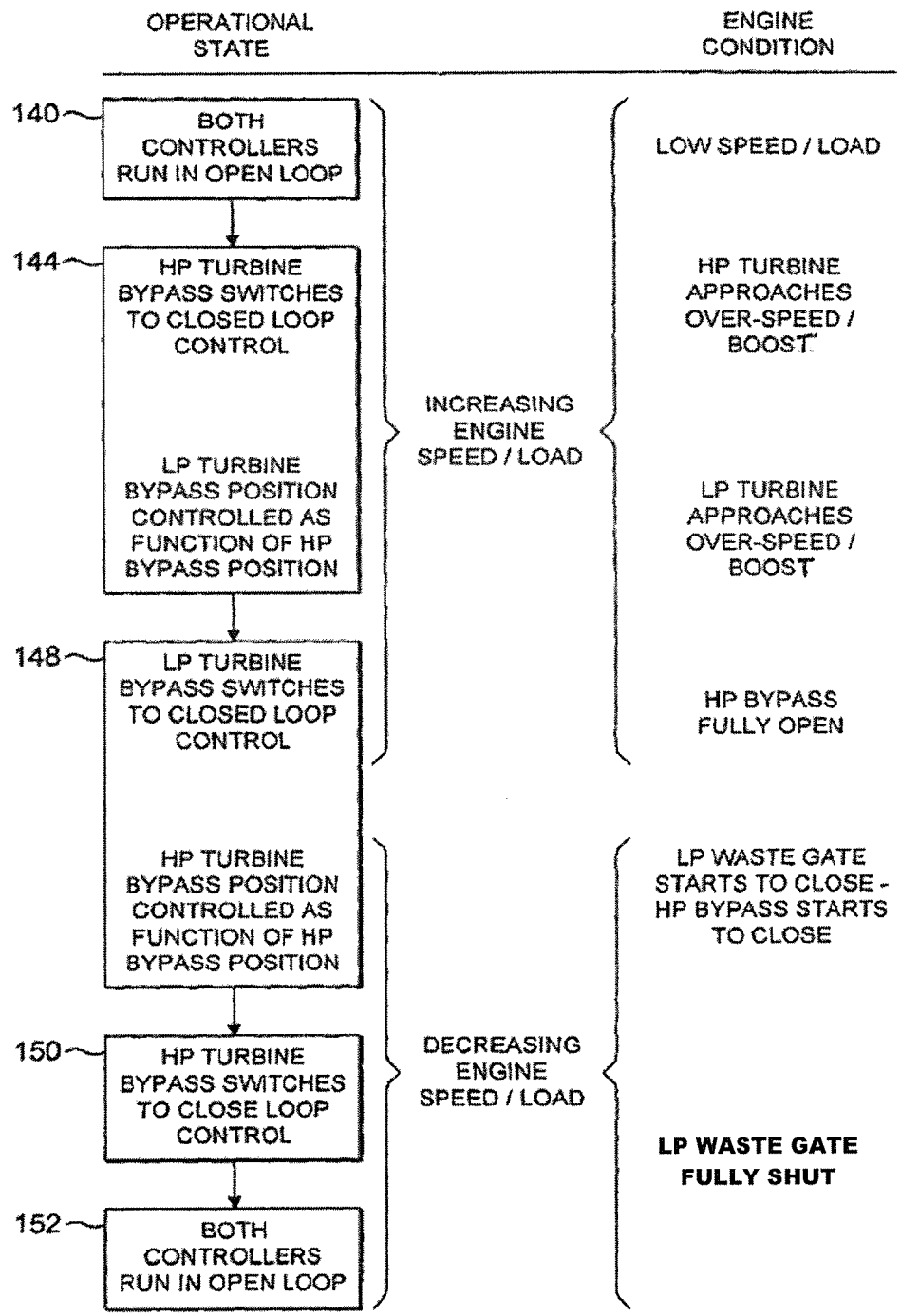
FIG. 6 is a flow diagram showing operation of the control scheme for handover of control between turbine bypass valves.

The specific scheme according to which individual PID controllers 126 are provided for each bypass valve on the turbine side can be understood with reference to FIG. 6.

In low speed/load conditions, when all the valves are shut, the system is run in open loop control at block 140, each individual controller for high and low pressure turbine bypass valves using the set points from its calibrated open loop map. It is possible in the initial state to run both controllers in open loop control as the bypass valves at low engine speeds are in fact typically at their fully closed positions such that closed loop control is not required. It will be appreciated that the open loop can be calibrated in any appropriate manner, for example during an initial pre-production calibration phase.

As the engine reaches the speed and load conditions when the high pressure turbine 30 approaches over-speed/boost, the high pressure turbine bypass switches to closed loop control at block 144. As discussed above with reference to FIG. 5, during closed loop control the high pressure turbine bypass valve is controlled to a desired boost pressure based on speed and load.

As the high pressure bypass valve 30 moves towards its maximum opening position it becomes necessary to prepare to hand over control to the low pressure bypass valve 101 in order to maintain closed loop control turbine bypass valve. This point is identified when the open loop set point valve position for the high pressure bypass valve reaches a threshold value corresponding to a point at which the high pressure turbine bypass valve 30 can no longer regulate boost due to being substantially open. At this stage the position of the low pressure turbine bypass valve is controlled as a function of the high pressure turbine bypass valve 30 position setpoint using a map of engine speed and high pressure turbine bypass valve position as also shown in block 144.

The high pressure turbine bypass valve continues to open to a fully open position at which point (or earlier) control must be passed to the low pressure turbine bypass valve in order to maintain closed loop control. Accordingly, at block 148 control is now switched to a second closed loop controller of the type shown in FIG. 5 which uses the low pressure turbo charger open loop map as the input together with boost pressure deviation and a PID controller as described above. It will be appreciated that a smooth transition is desirable at this stage to avoid abrupt movements of either turbine bypass valve position setpoint at the point of handover. This could occur where the set point low pressure valve position during slaved control by the high pressure valve position differed from the set point position from the open-loop map for the low pressure turbine bypass valve. The manner in which the transition is managed is described in more detail below but for completeness the remainder of the operation of the control strategy as the engine reduces speed/load is first discussed with reference to FIG. 6.

As the speed/load conditions are reduced from their maxima, (in a manner as described with reference to block 144) also at block 148, whilst continuing to control the boost pressure with closed loop control of the low pressure turbine bypass valve, the high pressure turbine bypass valve is then controlled as a function of the low pressure turbine bypass valve bypass valve position. Once again this is done using a map of engine speed and low pressure turbine bypass valve positions. The low pressure turbine bypass valve 101 starts to approach a fully closed position at which point (or earlier) control must be passed to the high pressure turbine bypass valve (at block 150) in order to maintain closed loop control and finally enters open loop control again at block 152.

Figure 7:
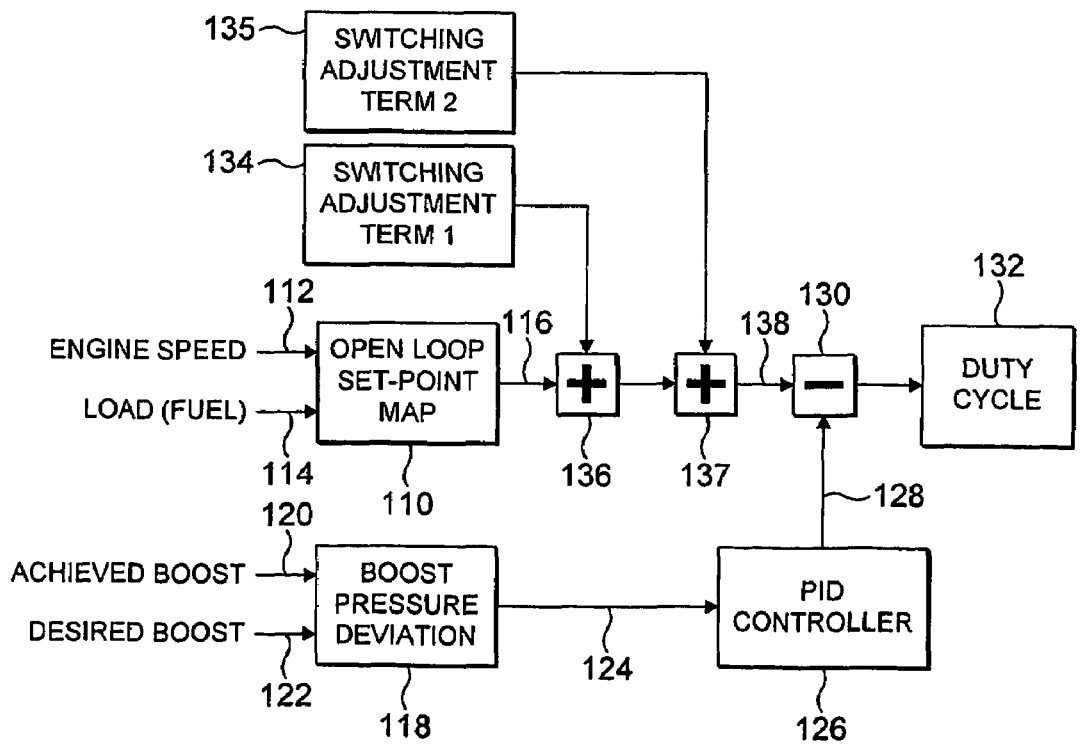
FIG. 7. is a block diagram showing a control scheme for a bypass valve scheme for a bypass valve following handover of control.

The transition strategy by which closed loop control is handed from one controller to the other as described with reference to FIG. 6, blocks 148 and 150, will now be described with reference to FIG. 7. In overview, the strategy achieves smooth transition firstly by compensating for any deviation between the expected valve position under slaved control from the other valve (prior to switching control) and the open loop set point (after transition). In addition the system allows for different PID gains to exist for the low and high pressure turbine bypass valve controllers (thereby allowing valves with significantly different time constants to be controlled and also at different engine speed/load conditions). The following discussion deals with the transition from closed loop control on the high pressure turbo charger to closed loop control on the low pressure turbo charger but it will be appreciated that it applies equally, mutatis mutandis, to transition in the other direction.

A key operating principle behind this aspect of the invention is as follows: in any transition from one closed loop controller to the other, the controller corrects the output of the open loop map for the destination controller to match the current position. This correction is in two parts, firstly modification of the open loop map output of the destination controller (to which control is handed) allowing for current position of the destination valve, and secondly modification of the open loop map output of the destination controller allowing for any differences in proportional gains between the two controllers.

Just before the change from closed loop control on the high pressure turbo charger to closed loop control on the low pressure turbo charger, the difference between the current position of the low pressure turbine bypass valve (according to the position determined as a function of the high pressure valve position from the mapping described above) and the position according to the low pressure turbine open loop map (for example map 110 shown in FIG. 5) is calculated. Referring now to FIG. 7 which corresponds to FIG. 5 and in which like numerals designate like components which are not described here to avoid repetition, this discrepancy or "switching adjustment term 1 (SAT 1)" is input at block 134 to an adder 136 allowing compensation of the output 116 of the open loop set-point map to provide a corrected value 138 to the subtractor 130. As a result removal of the discrepancy from the open loop map is achieved prior to the open loop term being changed by the PID controller. As a result there will be no sudden jump to a revised position on handover.

The second step is a further "switching adjustment term 2 (SAT 2)" input at block 135 to compensate for any difference between the P gains of each controller, which is input to an adder 137 downstream of the adder 136. As a general point, the integral term and differential (if used) term in the controller 126 should be reset to zero at all times when the controller is not being used. Accordingly the integral term in the low pressure PID controller 126 is set to zero ensuring that there is not over compensation for any initial error terms. The product of the proportional gain from the destination controller and the current boost pressure deviation is SAT 2 and must be added to the open loop map prior to the open loop term being changed by the PID controller At the moment of changeover of the high pressure closed loop controller to the low pressure closed loop controller, these two SATs must be frozen for the duration of closed loop control of the low pressure turbine bypass valve.

As a result it will be seen that a sophisticated, smooth and rapidly converging control strategy is provided for the turbocharger system, which allows seamless tracking of the desired boost pressure even during handover of control between the high pressure and low pressure bypass valves and vice versa.

As discussed above a high pressure compressor bypass valve 36 is also provided to prevent the high pressure compressor becoming a restriction to airflow during operation of the low pressure compressor 26. The use of a bypass channel in the context of a two stage turbocharging system with a valve of unspecified type between the interstage compressor position and the HP compressor outlet is known and described in EP0416520010411 (D/C/BorgWarner R2S patent), U.S. Pat. No. 5,408,979—in which a butterfly High Pressure Compressor Bypass valve may be electronically controlled but is a non return valve and U.S. Pat. No. 4,930, 315 in which a two stage charging system includes a charging bypass from low pressure (LP) outlet to high pressure (HP) charging pipe, bypassing the high pressure compressor with passive check valve (to prevent reverse flow) in the charging bypass.

In addition, other engines/supercharging systems in production use a mechanical/electrical supercharger in series with a turbocharger, with a passive or actively controlled non-return valve around the mechanical/electrical supercharger. An example of this is the Volvo Penta (passive non return valve (NRV) flap valve).

A problem with existing systems is that passively operated (self acting) non return valves have known problems with instability/response to pulsations/noise.

According to a further aspect of the invention, a method of operating an actively controlled butterfly valve used as an air side bypass in a two stage turbocharging system is provided.

As discussed above the two stage system is configured such that the HP stage and LP stage differ considerably in size (and therefore flow capacity), and the HP turbine 20 is bypassed (turbine bypass valve) at higher engine speeds such that its speed drops to very low levels. Consequently the HP compressor 22 produces no pressure rise, and in fact, if left in circuit, would act as a restriction to the airflow to the engine. The HP compressor bypass valve 36 is therefore necessary to provide an alternative route for air to bypass the HP compressor 22 when it is producing no pressure rise.

The valve is arranged to be commanded open when the pressures upstream and downstream of the HP compressor are equal (as detected by appropriate sensors). However once such a butterfly valve is commanded to be open, any resumption of operation of the HP compressor (i.e. by closing of the HP turbine bypass valve) will merely result in the airflow recirculating around the HP compressor via the bypass channel. Because the airflow is recirculating no pressure rise can be generated upstream of the HP compressor and the pressures upstream and downstream remain equal, therefore the bypass valve will remain open under the command of the pressure differential signal.

When in open loop boost control the HP compressor bypass operates in open loop mode from a calibrated speed and fuel map in a similar manner to that discussed above in relation to the turbine. When the closed loop boost pressure controller is in operation, the two turbine bypass valves (i.e. including the low pressure turbine bypass valve—not shown) can deviate significantly from their open loop maps, and, concurrently, the airflow behaviour can deviate significantly from steady state condition. Therefore the compressor bypass cannot by suitably controlled by the open loop maps.

During closed loop control therefore the pressures from the exit of the low pressure compressor (LPC) 26 and the entry to the intercooler 12 (post HP compressor 22) are compared. The post HP compressor 22 pressure (i.e. the pre-intercooler pressure) is estimated from the boost pressure with a correction for the estimated pressure drop across the intercooler 12.

The system embodied in the invention operates in the following manner:

When the LP compressor 26 out pressure exceeds the pre-intercooler pressure (i.e. there is a pressure drop across the HP compressor 22) the HP compressor bypass 36 is requested to open, as per the known technique.

When the HP bypass 36 closed loop setpoint closes beyond a threshold the compressor bypass 36 is requested to close. Hysteresis is included in the form of a timer to prevent the valve opening immediately again even if the pressure differential criteria is met. As a result a pressure differential can form, avoiding the problem identified above of the bypass valve flip-flopping open and closed rapidly.

The invention claimed is:

1. A method of controlling a turbo charger system having first and second turbo chargers with respective first and second operational ranges, comprising:
    controlling a first turbo charger according to a first control scheme in a first operational range and slaving control of a second turbo charger to the first control scheme, and
    controlling the second turbo charger according to a second control scheme in a second operational range in which at a transition between the first and second control schemes, a switch term is incorporated into the second control scheme, wherein the first control scheme is a PID control scheme and the switch term is a measure of the proportional gain according to the second control scheme.

2. A method as claimed in claim 1, in which the switch term is a measure of the deviation between a control parameter of the second turbo charger according to the first scheme and a control parameter of the second turbo charger according to the second scheme.

3. A method as claimed in claim 1, in which the integral term is initialized at zero according to the second control scheme.

4. A method as claimed in of claim 1, in which one of the first and second turbo chargers is a high pressure turbo charger and the other of the first and second turbo chargers is a low pressure turbo charger.

5. A control unit having a computer-readable medium encoded with a computer program configured to implement a method comprising:
  controlling a first turbo charger according to a first control scheme in a first operational range and slaving control of a second turbo charger to the first control scheme, and
  controlling the second turbo charger according to a second control scheme in a second operational range in which at a transition between the first and second control schemes, a switch term is incorporated into the second control scheme, wherein the first control scheme is a PID control scheme and the switch term is a measure of the proportional gain according to the second control scheme.

6. The control unit of claim 5, wherein said control unit is a computer.

7. The control unit of claim 5, wherein said control unit is an engine control unit.

* * * * *